United States Patent Office 2,814,848
Patented Dec. 3, 1957

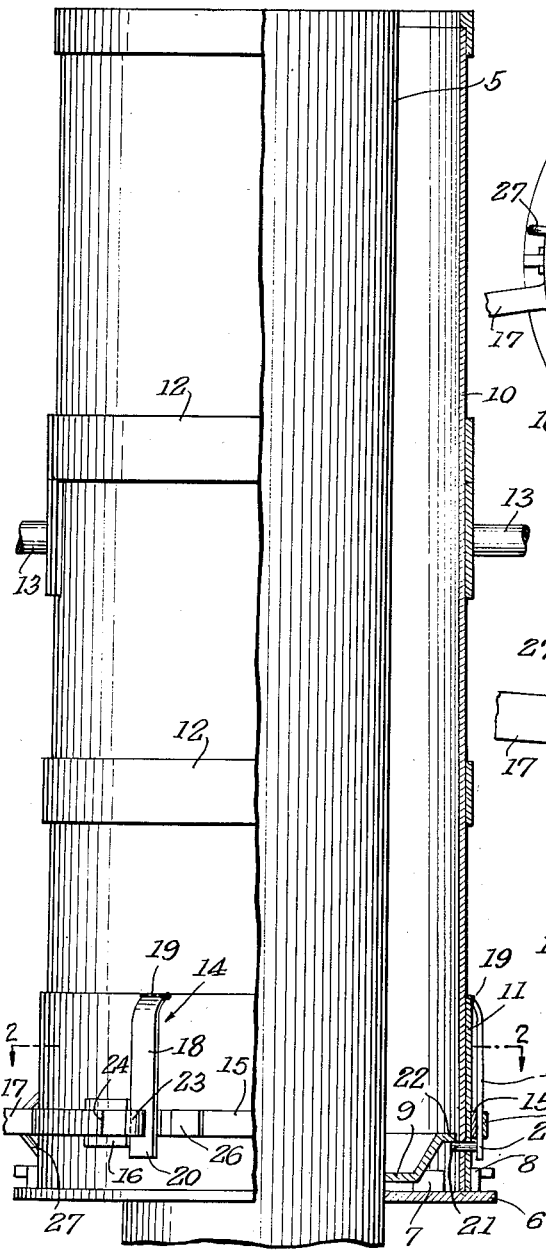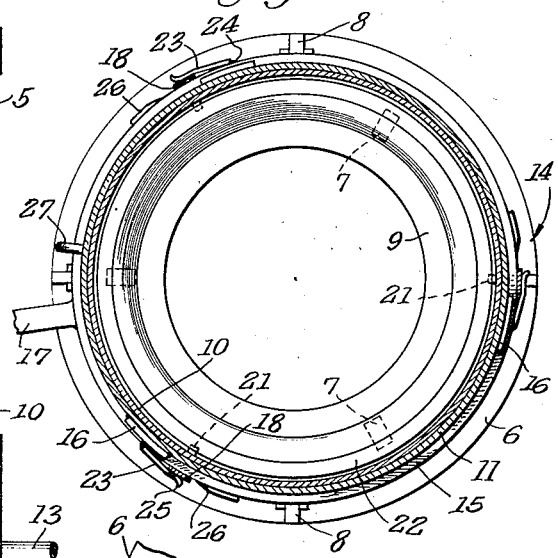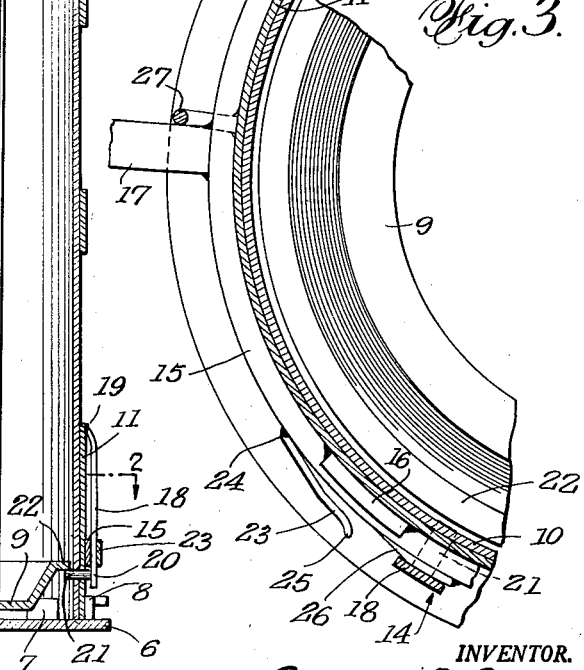

2,814,848

LOCKING MECHANISM FOR A PIPE MOLD STRUCTURE

Charles B. Pausch, Mecca, Calif.

Application January 10, 1955, Serial No. 480,875

3 Claims. (Cl. 25—126)

This invention relates to a mold for forming concrete pipe and it is an object of the invention to provide novel and improved means for assembling and dis-assembling the same during a pipe-molding operation.

In conventional pipe-molding apparatus, an elongated core is provided, an end pallet ring is strung over the core, and an outer shell or jacket placed around the core in concentric spaced relation thereto. These three components define an annular cavity into which concrete is introduced and packed and tamped into place. When the concrete has hardened sufficiently to be form-retaining, the core is withdrawn endwise. Now, the molded or cast pipe, together with the outer jacket and the pallet ring, is moved to a curing room where the jacket is removed leaving the cast pipe supported on the pallet ring as a support base for the pipe. After a suitable curing time, the pipe is removed from the pallet ring as a completed article and the latter may now be used in a molding or casting and tamping machine as above. The present invention has for another object to provide rapidly operable, sturdy and long-wearing means for interconnecting and separating, as desired, the pallet ring and the outer jacket.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes, one embodiment of the present invention, which is given by way of illustration or example only.

In the drawing, like reference characters designate similar parts in the several views.

Fig. 1 is an elevational view, in quarter section, of a pipe mold embodying the features of the invention.

Fig. 2 is a cross-sectional view as taken on line 2—2 of Fig. 1.

Fig. 3 is an enlarged fragmentary cross-sectional view showing the parts in another position.

The drawing shows a generally conventional core 5 that extends through a base plate 6 which is provided with two sets of locating blocks or the like 7 and 8. The blocks 7 are arranged nearer the center of base plate 6 and are formed to provide supports for a pallet plate 9. The sectional contour of pallet plate 9 determines the form of the pipe end to be molded. Thus, the pallet ring may vary in cross-sectional form and the blocks 7 designed accordingly to support and locate the pallet ring concentrically around core 5. The blocks 8 are used to locate the outer shell or jacket 10 in concentricity with the core and the pallet plate. Said jacket is shown with a lower reinforcing band 11, as well as with additional reinforcing bands 12 where needed, and with handles 13 that facilitate handling of said jacket. In the usual manner, said jacket and core are suitably tapered so that withdrawal of the core and removal of the jacket from the molded pipe may be readily effected. As seen in the drawing, the core is withdrawn in a downward direction and the jacket is removed upwardly.

The components above described are generally conventional and, according to this invention, the jacket 10 is provided with means 14 for separably interconnecting the pallet plate 9 with the jacket so that a pipe-molding operation is readily facilitated.

The means 14 includes a cam ring or band 15 encircling the lower end of the jacket 10 and the same is shown as applied around reinforcing band 11. Said ring 15 is guided for rotational movement by guide cleats 16 preferably welded to the jacket on either side of said ring. A radially extending handle 17 is provided on the ring and serves as a means by which the latter may be rotationally moved in one direction or the other, as desired.

The means 14 also includes a set of preferably uniformly spaced resilient fingers 18 that are each connected at one end, as by welds 19, to the upper edge of band 11, said fingers extending from said welds 19 toward and outside of ring 15. In this case, three fingers 18 are shown and the free ends 20 thereof are each provided with a pin or dog 21 that extends through a suitable hole in the jacket into the annular space between the jacket and core 5. As can be seen from Fig. 1, said dogs 21 are adjacent to the lower end of said annular space and are in position to extend beneath the marginal flange 22 of pallet ring 9.

For each finger 18, the ring 15 is provided with a cam lug 23 that is connected at one end to ring 15 by a weld 24 and has an outwardly-turned free end 25 that, when the ring 15 is rotated in a counter-clockwise direction, engages over the finger to press the same inwardly and, thereby, project the dog 21 into the mentioned position beneath the flange 22 of the pallet ring. Thus, as seen in Figs. 1 and 2, the pallet ring and mold jacket are interconnected. Hence, after a pipe has been cast and the core 5 is withdrawn, removal of the jacket 10 from the base plate 6 by handles 13 causes the simultaneous removal of the pallet plate or ring 9 and the pipe casting retained thereby in said jacket.

The means 14 further includes a wedge cam 26 provided for each finger 18, said cam being welded onto ring 15 in suitable spaced relation to its associated cam lug 23 so that, upon clockwise rotation of the cam ring, said wedge cam intrudes itself against the inner face of finger 18 to flex said finger outwardly. In this manner, the dogs 21 are retracted from engagement beneath pallet plate rim 22. Therefore, after removal of the mold and cast pipe to the curing room and setting the same upright, a sharp movement of the ring 15 by use of handle 17, causes retraction of the dogs 21 and enables upward removal of the jacket 10.

It will be noted that cam lugs 23 limit movement of the cam ring in counter-clockwise direction. A stop 27, welded to band 11, serves to limit clockwise movement of said ring by engagement with handle 17.

While the foregoing has illustrated and described what is now contemplated to be the best mode of carrying out the invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described the invention, what is claimed and desired to be secured by Letters Patent is:

1. Mechanism for controlling the movement between release and locking positions of a set of dogs that releasably connect the outer jacket and the end pallet plate of a pipe molding structure, said mechanism being wholly carried by the jacket of said structure and comprising a ring around the jacket, means guiding rotative movement of the ring, means limiting said movement of the ring in at least one direction, a set of flexibly mounted members carrying said dogs, and a pair of circumferentially spaced cams provided on the ring and operatively associated with each said member, one cam engaging the member to move and hold the dog thereon in locking position in one rotated position of the ring, and the other cam of said pair of cams engaging the member to move and hold the dog thereon in releasing position in the other rotated position of the ring.

2. Mechanism according to claim 1 in which the dog-mounting members are arranged transversely to the circumference of the ring and outwardly of said ring, and the cams associated with each said member being carried by the outer face of the ring.

3. Mechanism according to claim 1 in which the dog-mounting members are arranged transversely to the circumference of the ring and outwardly of said ring, and the cams associated with each said member being carried by the outer face of the ring, the cam engaged with the member to move the dog thereof to locking position being formed to engage over the outer side of the member to retain the same against flexure to releasing position of said dog.

References Cited in the file of this patent

UNITED STATES PATENTS

| | | |
|---|---|---|
| 571,372 | Inch | Nov. 17, 1896 |
| 862,123 | Adams | Aug. 6, 1907 |
| 1,677,677 | Irwin | July 17, 1928 |
| 2,684,517 | Woods | July 27, 1954 |